(12) United States Patent
Kwak et al.

(10) Patent No.: US 11,206,574 B2
(45) Date of Patent: Dec. 21, 2021

(54) METHOD AND APPARATUS FOR DATA COMMUNICATION BETWEEN MU AND RU USING MULTI-CHANNEL COMPRESSION ALGORITHM

(71) Applicant: INNOWIRELESS CO., LTD., Seongnam-si (KR)

(72) Inventors: Young Su Kwak, Suwon-si (KR); Min Ho Yu, Pohang-si (KR); Oh Keol Kwon, Seongnam-si (KR); Ik Hyeon Lee, Siheung-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 99 days.

(21) Appl. No.: 16/717,228

(22) Filed: Dec. 17, 2019

(65) Prior Publication Data

US 2021/0127294 A1    Apr. 29, 2021

(30) Foreign Application Priority Data

Oct. 29, 2019    (KR) .......................... 10-2019-0135957

(51) Int. Cl.
*H04L 12/66*        (2006.01)
*H04W 28/06*        (2009.01)
(Continued)

(52) U.S. Cl.
CPC ............ *H04W 28/06* (2013.01); *H04L 27/364* (2013.01); *H04W 28/0205* (2013.01); *H04W 84/20* (2013.01)

(58) Field of Classification Search
CPC ......... H04L 25/02; H04L 27/26; H04L 27/36; H04L 27/364; H04L 29/06; H04L 29/08;
(Continued)

(56) References Cited

U.S. PATENT DOCUMENTS

| 7,680,149 B2* | 3/2010 | Liu ....................... H04J 3/1617 370/466 |
| 8,174,428 B2* | 5/2012 | Wegener ................ H03M 7/30 341/173 |

(Continued)

FOREIGN PATENT DOCUMENTS

| KR | 10-1740932 B1 | 5/2017 |
| KR | 10-2017-0083819 A | 7/2017 |
| KR | 10-2018-0022891 A | 3/2018 |

OTHER PUBLICATIONS

De la Oliva et al., An Overview of the CPRI Specification and Its Application to C-RAN-Based LTE Scenarios, IEEE, 8 pages, Feb. 2016.*

(Continued)

*Primary Examiner* — Frank Duong
(74) *Attorney, Agent, or Firm* — Novick, Kim & Lee, PLLC; Jae Youn Kim

(57) ABSTRACT

Provided is a radio access network system in which a master unit compresses control management data to be allocated to a sub-channel of a public air interface (CPRI), and transmits the compressed control management data to a radio unit through a sub-channel of a public air interface, and the radio unit receives the compressed control management data through a sub-channel of a public air interface, and restores the compressed control management data.

11 Claims, 5 Drawing Sheets

(51) Int. Cl.
*H04L 27/36* (2006.01)
*H04W 28/02* (2009.01)
*H04W 84/20* (2009.01)

(58) Field of Classification Search
CPC ......... H04L 29/10; H04L 29/14; H04L 69/04; H04L 69/14; H04W 28/02; H04W 28/0205; H04W 28/06; H04W 84/20; H04W 92/04
See application file for complete search history.

(56) References Cited

U.S. PATENT DOCUMENTS

| | | | |
|---|---|---|---|
| 9,998,310 B2* | 6/2018 | Barbieri | H04W 72/0413 |
| 10,064,242 B2* | 8/2018 | Pawar | H03M 7/40 |
| 10,159,013 B2* | 12/2018 | Tomita | H04W 28/08 |
| 10,582,414 B2* | 3/2020 | Shor | H04W 88/085 |
| 2010/0087227 A1* | 4/2010 | Francos | H03F 1/3247 |
| | | | 455/562.1 |
| 2014/0079037 A1* | 3/2014 | Evans | H04W 28/06 |
| | | | 370/336 |
| 2015/0358030 A1* | 12/2015 | Xia | H04L 27/2626 |
| | | | 341/87 |

OTHER PUBLICATIONS

Guo et al, LTE/LTE—A Signal Compression on the CPRI Interface, Bell Labs Technical Journal DOI: 10.1002/bltj, 17 pages, 2013.*

* cited by examiner

METHOD AND APPARATUS FOR DATA COMMUNICATION BETWEEN MU AND RU USING MULTI-CHANNEL COMPRESSION ALGORITHM

BACKGROUND OF THE INVENTION

1. Field of the Invention

The present invention relates to a method and an apparatus for data communication between a MU and a RU using a multi-channel compression algorithm.

2. Description of the Related Art

The contents described in this section merely provide background information on the embodiments of the present invention and do not constitute a prior art.

Mobile traffic by over-the-top (OTT) video services such as YouTube and mobile Internet TV is rapidly increasing. There are required more separate base stations to process increasing data traffic. As communication data between a MU and a RU has rapidly increased, the standard of a common public radio interface (CPRI), which is a digital interface, has recently failed to meet the requirements for bandwidth processing. While standardization for the in-phase and quadrature (IQ) data compression technique of CPRI is underway, the CPRI includes not only IQ data but also other data.

DOCUMENT OF RELATED ART

Patent Document (Patent document 0001) Korean Registered Patent Publication No. 10-1740932 (issued on May 23, 2017)
(Patent document 0002) Korean Unexamined Patent Publication No. 2017-0083819 (published on Jul. 19, 2017)
(Patent document 0003) Korean Unexamined Patent Publication No. 2018-0022891 (published on Mar. 6, 2018)

SUMMARY OF THE INVENTION

To solve the problems described above, an object of the present invention is to provide a method and an apparatus for data communication between a MU and a RU using a multi-channel compression algorithm, in which a master unit compresses control management data to be allocated to a sub-channel of a public air interface (CPRI), and transmits the compressed control management data to a radio unit through a sub-channel of a public air interface, the radio unit receives the compressed control management data through a sub-channel of a public air interface, and restores the compressed control management data, such that the size of the transmitted control management data is reduced and the communication speed of the entire network is improved.

Still other objects of the present invention may be further considered within the scope that can be easily inferred from the following detailed description and effects thereof.

To achieve the objects described above, according to one aspect of the present invention, there is provided a master unit which includes a processor; a memory configured to store a program executed by the processor; and a communication interface, wherein the processor is configured to compress control management data to be allocated to a sub-channel of a common public radio interface (CPRI), and the communication interface is configured to transmit the compressed control management data to a radio unit through the sub-channel of the CPRI.

The common public radio interface may be defined as a plurality of basic frames constituting a hyper frame, in which each basic frame includes a control word and a payload, the payload may correspond to an in-phase and quadrature data (IQ data) block of user data, and K control words may gather to form M sub-channels (where M is a natural number less than K).

The control management data to be allocated to the sub-channel of the CPRI may include (i) fast control management (C&M) data, (ii) slow control and management (C&M) data, and (iii) first layer in-band protocol data, and (iv) vendor specification data.

The compressed control management data may be compressed for each sub-channel in relation to a part or all of (i) the fast C&M data, (ii) the slow C&M data, (iii) the first layer in-band protocol data, and (iv) the vendor specification data.

The processor may be configured to select one compression algorithm from a plurality of compression algorithms according to a reference data size, and apply the selected compression algorithm to compress the control management data.

The sub-channel to which the compressed control management data may be allocated includes (i) a first flag having information about whether the sub-channel is compressed and (ii) a second flag having information about the selected compression algorithm.

The plurality of compression algorithms may be selected from LZ4 compression scheme, Snappy compression scheme, Broti compression scheme, Zstandard compression scheme, and Gzip compression scheme.

According to another aspect of the present invention, there is provided a radio unit which includes one or more processors; a memory configured to store one or more programs executed by the one or more processors; and a communication interface, wherein the communication unit is configured to receive control management data compressed by a master unit through a sub-channel of a common public radio interface (CPRI), and the processor is configured to restore the compressed control management data allocated to the sub-channel of the CPRI.

According to still another aspect of the present invention, there is provided a radio access network system which includes a master unit and a radio unit communicating through a common public radio interface (CPRI), wherein the master unit is configured to compress control management data to be assigned to a sub-channel of the CPRI, and transmit the compressed control management data to the radio unit through the sub-channel of the CPRI, and the radio unit is configured to receive the control management data compressed by the master unit through the sub-channel of the CPRI and restore the compressed control management data allocated to the sub-channel of the CPRI.

As described above, according to the embodiments of the present invention, the master unit compresses control management data to be allocated to a sub-channel of a public air interface (CPRI), and transmits the compressed control management data to a radio unit through a sub-channel of a public air interface, the radio unit receives the compressed control management data through a sub-channel of a public air interface, and restores the compressed control management data, such that the size of the transmitted control management data is reduced and the communication speed of the entire network is improved.

Meanwhile, it is added that effects described in the following specification and provisional effects thereof, which are expected by the technical features of the present invention, are considered as the effects described in the specification of the present invention even though these effects are not clearly mentioned herein.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
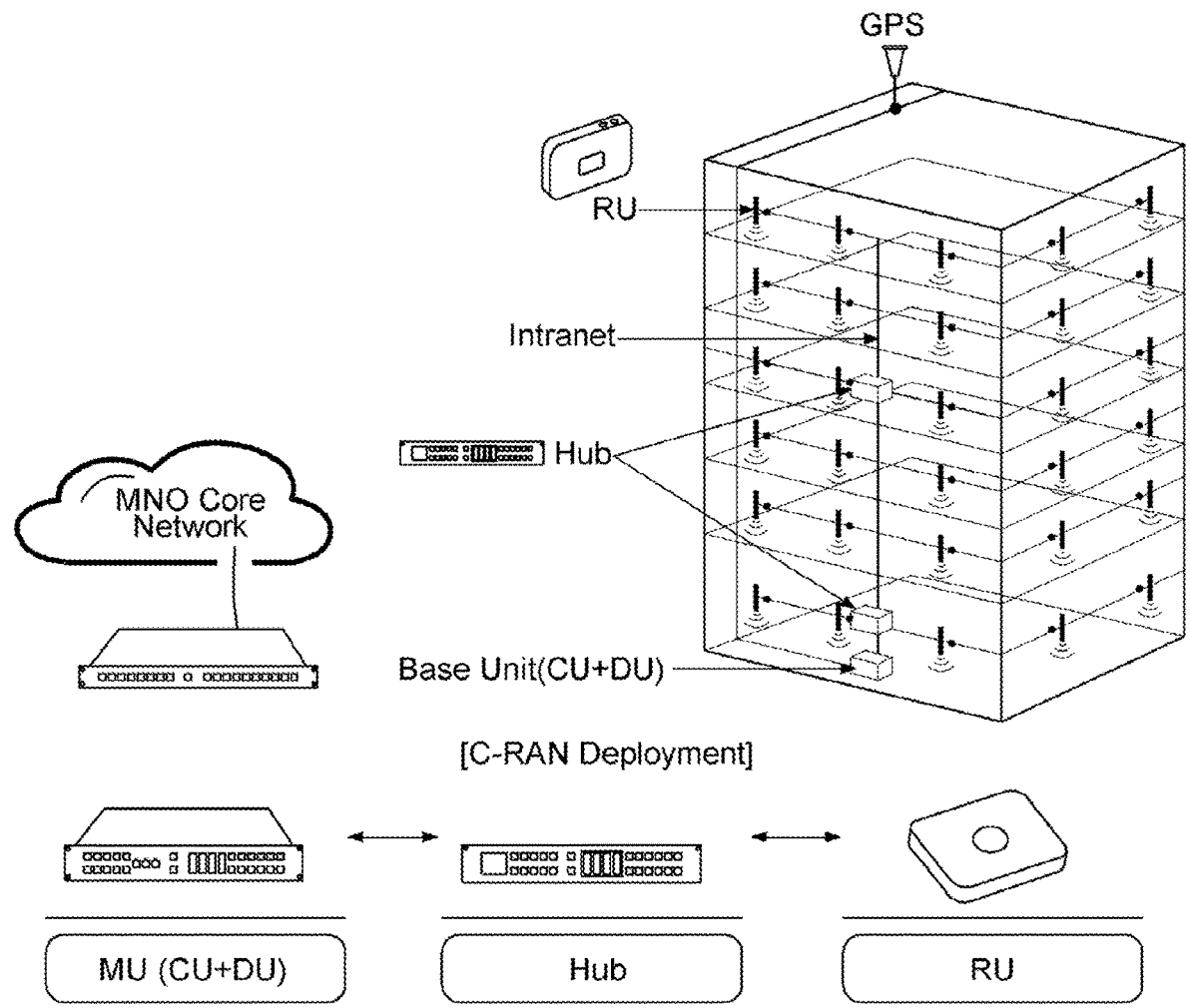
FIGS. 1 and 2 are views illustrating a radio access network system according to an embodiment of the present invention.
Figure 2:
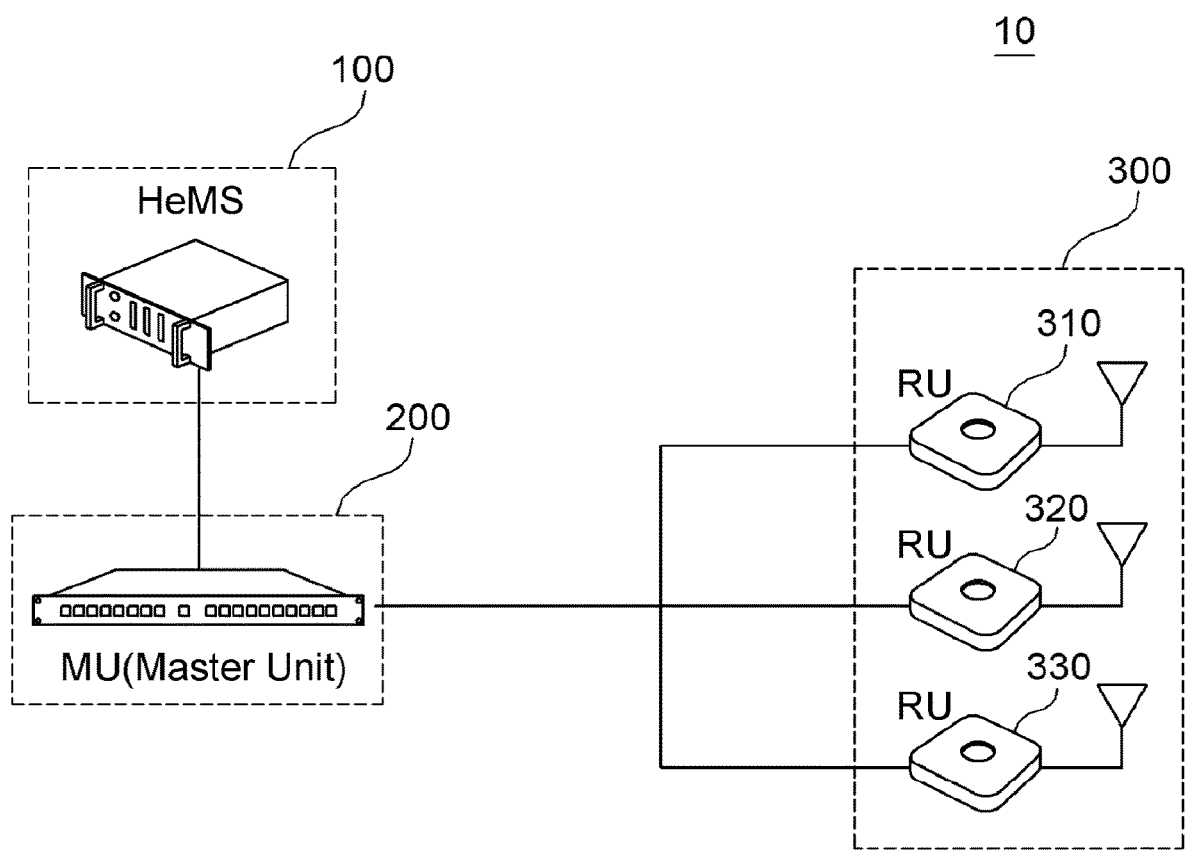

Hereinafter, a detailed description of well-known features or functions will be ruled out in order not to unnecessarily obscure the gist of the present disclosure. Exemplary embodiments of the present disclosure will be described in detail with reference to the accompanying drawings FIGS. 1 and 2 are views illustrating a radio access network system according to an embodiment of the present invention.

In a wireless communication system, an interface between a base band unit (BBU) and a remote radio unit (RRU) or between different RRUs is referred to as a radio fronthaul interface.

The BBU, also called a master unit (MU), includes a central unit (CU) and a digital unit (DU). The RRU is also called a radio unit (RU).

The radio access network system may be formed in a cloud radio access network (C-RAN) structure. In the C-RAN, the DU and RU are separated and remotely spaced apart from each other. The spaced DU and RU are connected through an optical cable. Since the RU has a radio transceiver, a baseband I/Q sample is required to be transmitted to a DAC of the RU. The separated DU and RU require an interface specification for communication. There is a common public radio interface (CPRI) as a representative signal interworking interface.

The MU and RU exchange user data, control & management data, and timing & synchronization information through the CPRI interface.

The user data is transmitted through an IQ data block in a CPRI basic frame in the form of a baseband digital IQ stream. The RU receives the IQ data block, converts the digital IQ stream into an analog IQ stream, amplifies the analog IQ stream, and transmits the analog IQ stream to the user device through an antenna.

The control management data and time synchronization information are transmitted through a CPRI sub-channel, and are used by only the DU and RU, and are irrelevant to the LTE/5G layer.

When the traffic of control management data is increased, the data communication speed slows. When the traffic is increased on limited network resources, a data communication delay may occur.

The radio access network system according to an embodiment allocates the control management data among data exchanged between the MU and the RU through a fronthaul to each channel, and compresses and transmits the data when the data is larger than a predetermined amount. By decompressing the received data, the data communication time is reduced. A compression reference size, a compression status, and a compression algorithm may be set for each channel.

Referring to FIG. 2, the radio access network system includes a master unit (MU) 200 and a radio unit (RU) 300 that communicate through a CPRI. The MU 200 is connected to the base station management server (HeMS) 100.

The master unit 200 compresses the control management data to be allocated to the sub-channel of a public radio interface, and transmits the compressed control management data to the radio unit 300 through the sub-channel of the public radio interface. The sub-channel to which the compressed control management data is allocated may include (i) a first flag having information about whether a sub-channel is compressed and (ii) a second flag having information about a selected compression algorithm.

The master unit 200 includes a processor, a memory for storing a program executed by the processor, and a communication interface. The processor compresses the control management data to be assigned to a sub-channel of the CPRI. The communication interface transmits the compressed control management data to the radio unit through the sub-channel of the CPRI.

The master unit 200 compresses control and management data, not user data and timing & synchronization information, in the CPRI.

The CPRI is defined as a plurality of basic frames constituting a hyper frame, and each basic frame includes a control word and a payload. The payload corresponds to an in-phase and quadrature data (IQ data) block of user data. K control words gather to form M sub-channels. 'M' is a natural number smaller than 'K'. For example, 'K' is 256 and 'M' may be set to 64.

The control management data to be assigned to the sub-channel of the CPRI include (i) Fast control management (C&M) data, (ii) slow C & M data, and (iii) L1 in-band protocol data, and (iv) vendor specification data.

The compressed control management data is compressed for each sub-channel in relation to a part or all of (i) high speed control management data, (ii) low speed control management data, (iii) first layer in-band protocol data, and (iv) the vender specification data. For example, only fast control management data may be compressed.

The radio unit 300 receives the control management data compressed by the master unit 200 through the sub-channel of the CPRI and restores the compressed control management data allocated to the sub-channel of the CPRI.

The radio unit 300 includes one or more processors, a memory for storing one or more programs executed by the one or more processors, and an interface. The communication interface receives the control management data compressed by the master unit through the sub-channel of the CPRI. The processor recovers the compressed control management data allocated to the sub-channels of the CPRI.

The radio access network system enables data communication between the MU and the RU using a multi-channel compression algorithm. When the control management data are compressed in the CPRI, the compression algorithm to use and the size of data to be compressed may be set. There are five types of compression algorithms that can be set.

The LZ4 compression scheme is LZ77 series compression algorithm which is developed by Yann Collet and is a lossless data compression algorithm focused on compression/decompression speed. The LZ4 compression scheme supports a multicore.

The Snappy compression is a compression algorithm which is developed by Google from LZ77, provides a moderate compression rate, supports fast compression/decompression, and has low CPU consumption.

The Brotli compression scheme is a general purpose lossless compression algorithm which is developed by Google by using a combination of the LZ77 algorithm and Huffman. Brotli compression scheme has higher compression efficiency than a conventional general algorithm.

The Zstandard (zstd) compression scheme is a LZ77 series lossless data compression algorithm developed by Facebook, which provides real-time compression and a high compression rate.

The Gzip compression scheme is a GNU data compression algorithm that is a general purpose compression algorithm used on Linux.

As well as LZ4, Snappy, Broth, Zstandard, and Gzip, other compression algorithms may be applied to compress the control management data depending on the design required.

Figure 3:
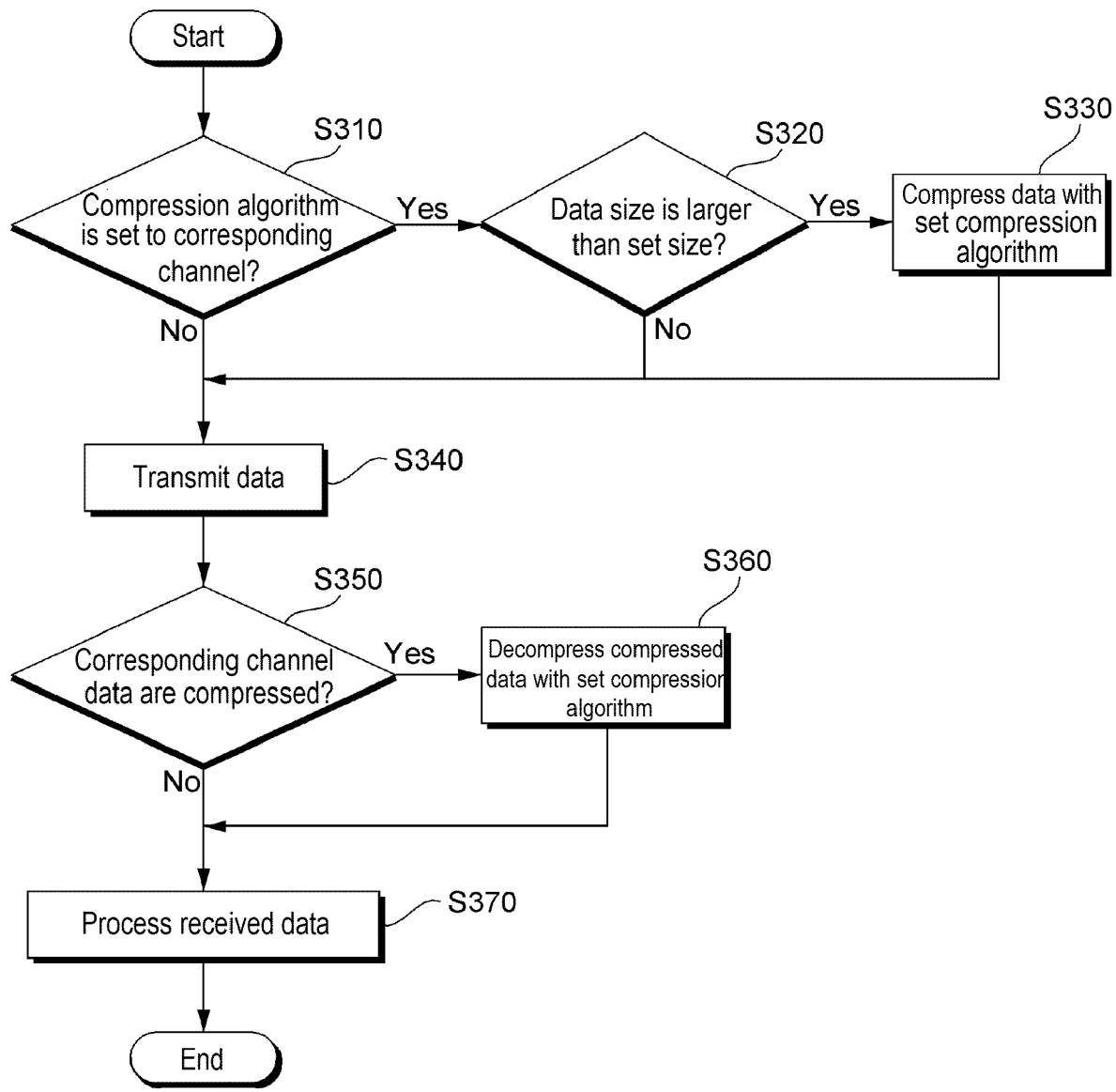
FIG. 3 is a flowchart illustrating the operations of a master unit and a radio unit according to an embodiment of the present invention.

FIG. 3 is a flowchart illustrating the operations of a master unit and a radio unit according to an embodiment of the present invention.

The master unit receives the control management data to be transmitted to the radio unit.

In operation S310, the master unit checks which channel the control management data is and confirms the compression algorithm setting of the corresponding channel.

In operation S320, when the compression algorithm of the corresponding channel is set, the master unit determines whether a size of data size is larger than a set size.

In operation S330, the master unit performs compression when the data size is larger than the set size. The processor selects one compression algorithm from a plurality of compression algorithms according to a reference data size, and applies the selected compression algorithm to compress the control management data. The sub-channel to which the compressed control management data are allocated includes (i) a first flag having information about the presence or absence of compression of the sub-channel and (ii) a second flag having information about the selected compression algorithm. The plurality of compression algorithms may be selected from LZ4 compression scheme, Snappy compression scheme, Brotli compression scheme, Zstandard compression scheme, and Gzip compression scheme.

In operation S310, when the compression algorithm is not set in the channel, information indicating non-compression is recorded in the first flag. In operation S330, when compression is performed, information indicating that compression is performed is recorded in the first flag, and information specifying the type of the compression algorithm is recorded in the second flag.

In operation S340, the master unit transfers the compressed data to the radio unit. In operation S340, when the data is not compressed, the master unit transmits the uncompressed data to the radio unit.

In operation S350, the radio unit checks whether the received channel is compressed. The sub-channel to which the compressed control management data are allocated includes (i) a first flag having information about the presence or absence of compression of the sub-channel and (ii) a second flag having information about the selected compression algorithm.

In operation S360, the radio unit performs data decompression when the channel data are compressed. The processor selects one compression algorithm from the plurality of compression algorithms according to the first and second flags, and applies the selected compression algorithm to restore the compressed control management data. The plurality of compression algorithms may be selected from the LZ4 compression scheme, the Snappy compression scheme, the Brotli compression scheme, the Zstandard compression scheme, and the Gzip compression scheme.

In operation S370, the radio unit processes the data according to the purpose of the control management data.

Figure 4:
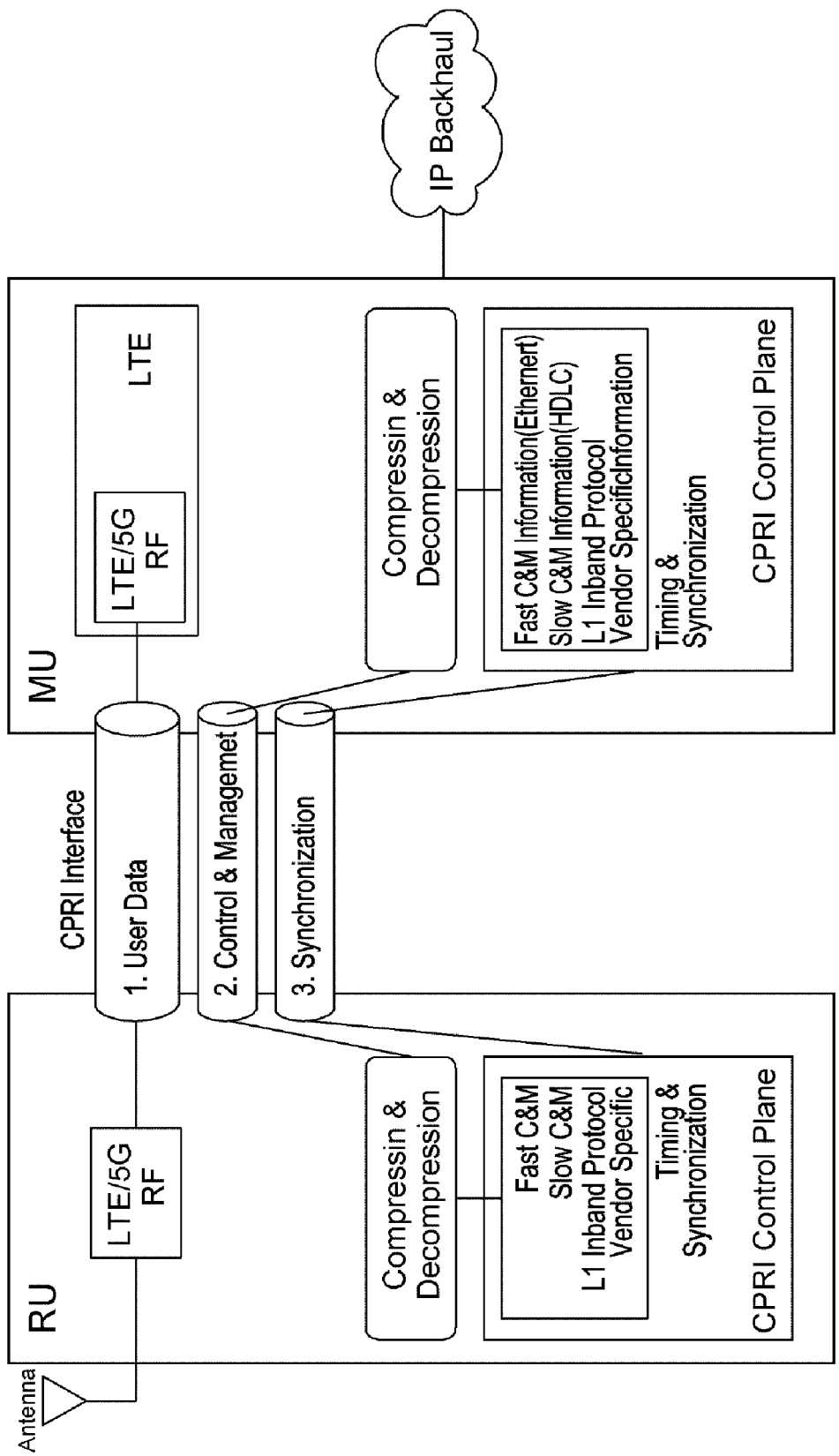
FIG. 4 is a view illustrating a common public radio interface used by a master unit and a radio unit according to an embodiment of the present invention.

FIG. 4 is a view illustrating a common public radio interface used by a master unit and a radio unit according to an embodiment of the present invention.

In a conventional integrated base station, since the I/Q samples transferred to the DAC through the internal bus in the system must be generated in a C-RAN environment, and large I/Q samples are transferred to the DAC in the RU located at a cell site through the CPRI link, the CPRI link require high bandwidth. There is a scheme of compressing the I/Q sample to reduce the amount of I/Q sample data to be transmitted.

Unlike the scheme of compressing I/Q sample data, the embodiment compresses the control management (C&M) data. The control management data and synchronization information are transmitted through the CPRI sub-channel.

The CPRI protocol architecture includes two layers and three planes. Two layers are a physical layer (Layer 1: L1) which is a first layer and a data link layer (Layer 2: L2) which is a second layer. The three planes are a user plane, a control and management plane (C & M plane), and a synchronization (SYN) plane. Digital baseband signal data are exchanged in the user plane, control information and link/node maintenance information are exchanged in the control management plane, and synchronization and time information is exchanged between nodes in the synchronization plane.

The user plane data includes in-phase and quadrature data (IQ data) and a control word of the user. The IQ data of Layer 2 are transmitted and received in the user plane. The user data is transmitted through an IQ data block in a CPRI basic frame in the form of a baseband digital IQ stream. After receiving, the RU converts the user data into an analog signal, and amplifies and transmits the signal to a user device through an antenna.

The control management plane data include Ethernet data, high-Level data link control (HDLC) data, and a control word. The Ethernet data is used for Fast C & M. The HDLC data are used for slow C & M. HDLC is used as a slow C & M channel and Ethernet is used as a fast C & M channel. Vendor specific is a part that can be arbitrarily defined and used by a manufacturer.

The sync plane may use L1 in-band protocol. The L1 in-band protocol exchanges time information, system startup and reset, and link management information that require fast exchange between layers of L1. The L1 mainly defines a time division multiplexing property, an electrical transmission property, an optical transmission property, and the like.

The control management data include fast control management (fast E & M), slow control management (slow E & M), first layer in-band protocol data, control AxC data, and vendor specific data. Such data types are divided into sub-channels, and the master unit and the radio unit according to an embodiment perform compression/decompression by using a predetermined compression algorithm when the data size of the sub-channel are larger than a predetermined size.

The sub-channel includes a control word in the CPRI basic frame, and the CPRI sub-channel is formed in CPRI high frame units. The high frame includes 256 basic frames. The basic frame includes a control word and a payload. The control words in the high frame constitutes 64 sub-channels. The control management data and the synchronization information are mapped and transmitted in a sub-frame. The payload is divided by using time division multiplexing to transmit several independent IQ data.

Number '0' of the sub-channel carries sync time information, Number '1' carries slow C & M, number '2' carries the L1 in-band protocol, numbers '4' to '7' carry control AxC data, numbers '16' to '194' carry vendor specific information to the sub-channel indicated by pointer 'p' in control word, and fast C & M information is carried through the sub-channel indicated by pointer 'p' to number '63'.

The master unit according to an embodiment may reduce the size of data by compressing and transmitting the control management data. As the size of data to be transmitted is reduced, the communication time may be shortened. By reducing the size of the communication, it is possible to overcome the limitation of the physical communication line. The network load is reduced on the whole, thereby exerting an influence on other data communication channels.

A radio access network system according to another embodiment relates to a firmware update scheme in a cloud cell environment. Wireless communication equipment such as a cloud cell provides firmware for equipment operation, and provides an update function for managing the corresponding firmware and improving the function. In the case of an existing small cell firmware, although the MU and the RU are integrated so that it is possible to update the MU/RU with one firmware, because the MU and the RU are separated from each other in the cloud cell environment, there is a need to improve the conventional firmware update scheme.

After the firmware of the MU is updated through the HeMS in the cloud cell environment, we propose a scheme of updating the firmware by transmitting a firmware update notification from the MU to the RU, so that the firmware of the MU/RU may be updated by a single operation in HeMS.

A process of performing a firmware update of a cloud cell in which the master unit 200 and the radio unit 300 are separated from each other through a firmware package provided by the base station management server 100 in the radio access network system 10 will be described.

The firmware update of the radio access network system 10 may include a first operation of changing a firmware package configuration, a second operation of transferring a firmware package file from the base station management server 100 to the master unit 200, and a third operation of transmitting an individual firmware image file from the master unit 200 to each radio unit 200, a fourth operation of performing the firmware update of the radio unit 300, and a fifth operation of reporting the result of performing the firmware update.

Referring to the first operation, since the master unit 200 and the radio unit 300 are integrated, the structure of the firmware package of the existing small cell is composed of one firmware image file. However, in the cloud cell environment of the radio access network system 10 according to the embodiment, the firmware image for the master unit 200 and the firmware image for the radio unit 300 constitutes a firmware package while being separated. In this case, the firmware package including the firmware image for the master unit 200 and the firmware image for the radio unit 300 may be uploaded to a file transfer protocol (FTP) server of the base station management server 100 to be provided to the master unit 200. However, the embodiment is not limited thereto, and the firmware package may be stored in various ways as long as the firmware package may be provided to the master unit 200.

Referring to the second operation, when the master unit 200 receives the firmware update notification from the base station management server 100, the master unit 200 may download the firmware package after accessing to the base station management server 100 using the FTP scheme. When the downloading of the firmware package is completed, the master unit 200 decompresses the firmware package and performs a firmware update of the master unit 200 by using the first firmware image for the master unit. After the firmware update of the master unit 200 is completed, the master unit 200 transmits a firmware update notification to each radio unit 300.

Referring to the third operation, when each radio unit 300 receives the firmware update notification from the master unit 200, each radio unit 300 downloads the second firmware image for the radio unit after accessing to the master unit 200 by using the FTP scheme.

Referring to the fourth operation, each radio unit 300 performs the firmware update by using the second firmware image downloaded.

When the firmware update is completed, the radio unit 300 transmits a firmware update complete notification to the master unit 200.

Referring to the fifth operation, when receiving the firmware update completion signals from all radio units 300, the master unit 200 transmits an integrated update completion signal (performance result) to the base station management server 100. The master unit 200 may notify through the integrated update completion signal that all firmware updates are completed. Meanwhile, when the master unit 200 does not receive a firmware update completion signal from the radio unit 300 until the preset time out reference (for example, 10 minutes) is exceeded or the radio unit 300 fails to update the firmware, the master unit 200 may transmit the integrated update complete signal including a firmware update error message to the base station management server 100.

The master unit 200 obtains the firmware package from the base station management server 100 and performs an operation of extracting the firmware image included in the firmware package.

The master unit 200 obtains the firmware package from the base station management server 100 based on the download request signal. The master unit 200 extracts the first and second firmware images included in the firmware package. In this case, the first firmware image means a firmware image file for the master unit, and the second firmware image means a firmware image file for the radio unit.

The master unit 200 may control the firmware update of the radio unit 300 to be performed in an order determined according to the firmware state or priority of each of the at least one radio unit 300.

Figure 5:
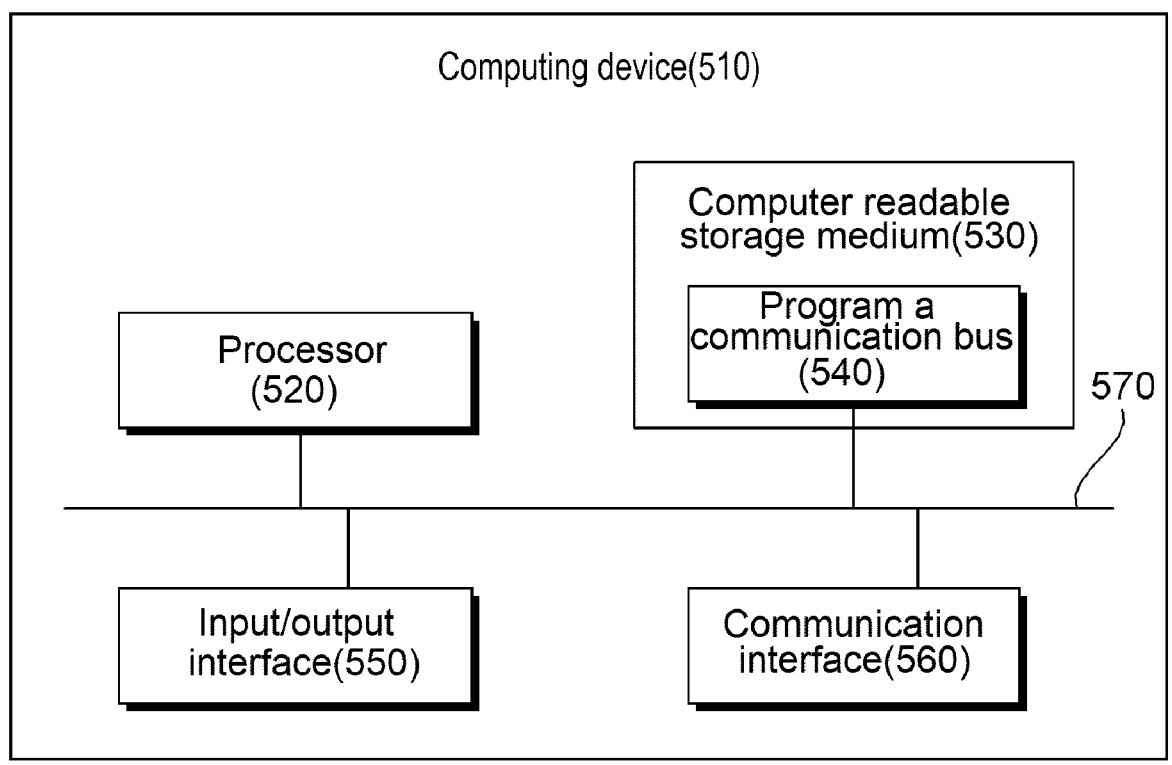
FIG. 5 is a block diagram illustrating a hardware configuration of a master unit and a radio unit according to embodiments of the present invention.

FIG. 5 is a block diagram illustrating a hardware configuration of a master unit and a radio unit according to embodiments of the present invention.

The master unit 200 and the radio unit 300 may be implemented with a computing device 510.

The computing device 510 includes at least one processor 520, a computer readable storage medium 530, and a communication bus 570.

The processor 520 may control to operate as the computing device 510. For example, the processor 520 may execute one or more programs stored in the computer readable storage medium 530. One or more programs may include one or more computer executable instructions, where the computer executable instruction may be configured to allow the computing device 510 to perform operations according to an embodiment when executed by the processor 520.

The computer readable storage medium 530 is configured to store computer executable instructions, program codes, program data and/or other suitable forms of information. The program 540 stored in computer readable storage medium 530 includes a set of instructions executable by processor 520. In an embodiment, the computer readable storage medium 130 may include a memory (a volatile memory, such as a random access memory, a nonvolatile memory, or a suitable combination thereof), one or more magnetic disk storage devices, optical disk storage devices, flash memory devices, or any other form of storage medium that is accessible by computing device 510 and capable of storing desired information, or a suitable combination thereof.

The communication bus 570 interconnects various other components of the computing device 510, including the processor 520 and the computer readable storage medium 140.

In addition, the computing device 510 may include one or more input/output interfaces 550 and one or more communication interfaces 560 that provide interfaces for one or more input/output devices. The input/output interface 550 and the communication interface 560 are connected to the communication bus 570. The input/output device may be connected to other components of the computing device 510 through the input/output interface 550.

The master unit 200 and the radio unit 300 may be implemented in a logic circuit by hardware, firmware, software, or a combination thereof, or may be implemented using a general purpose or special purpose computer. The device may be implemented using a hardwired device, a field programmable gate array (FPGA), an application specific integrated circuit (ASIC), or the like. In addition, the device may be implemented with a system-on-chip (SoC) including one or more processors and controllers.

The master unit 200 and the radio unit 300 may be mounted in the form of software, hardware, or a combination thereof on a computing device or server provided with hardware elements. The computing device or server may means all or a part of a communication device such as a communication modem for performing communication with various devices or wired and wireless communication networks, a memory for storing data for executing a program, a microprocessor for executing a program to operate and instruct, and the like.

Although each operation is described as being sequentially executed in FIG. 3, this is merely an example, and a person skilled in the art may be variously changed or modified by changing the order described in FIG. 3 without departing from the essential characteristics of the embodiment of the present invention, executing in parallel one or more operations, or adding other operations.

The operations according to the above-described embodiments of the present invention may be implemented with program instructions which may be executed through various computer means and may be recorded in a computer-readable medium. The computer-readable medium refers to any medium that participates in providing instructions to a processor for execution. The computer-readable medium may include a program instruction, a data file, a data structures, or the combination thereof. For example, there may be a magnetic medium, an optical recording medium, a memory, and the like. The computer programs may be dispersed throughout computer systems connected via networks and may store or execute a code readable by a computer in a dispersion manner. Functional programs, codes, and code segments for implementing the present embodiment may be easily inferred by programmers in the art to which the present embodiment belongs.

The disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A master unit comprising:
   a processor;
   a memory configured to store a program executed by the processor; and
   a communication interface,
   wherein the processor is configured to compress control management data to be allocated to a sub-channel of a common public radio interface (CPRI), and
   the communication interface is configured to transmit the compressed control management data to a radio unit through the sub-channel of the CPRI,
   wherein the processor is configured to select one compression algorithm from a plurality of compression algorithms according to a reference data size, and apply the selected compression algorithm to compress the control management data, and
   the sub-channel to which the compressed control management data are allocated includes (i) a first flag having information about whether the sub-channel is compressed and (ii) a second flag having information about the selected compression algorithm.

2. The master unit of claim 1, wherein the CPRI is defined as a plurality of basic frames constituting a hyper frame, in which each basic frame includes a control word and a payload,
   the payload corresponds to an in-phase and quadrature data (IQ data) block of user data, and
   K control words gather to form M sub-channels, wherein M is a natural number less than K.

3. The master unit of claim 1, wherein the control management data to be allocated to the sub-channel of the CPRI include (i) fast control management (C&M) data, (ii) slow control and management (C&M) data, and (iii) first layer in-band protocol data, and (iv) vendor specification data, and
   the compressed control management data are compressed for each sub-channel in relation to a part or all of (i) the fast C&M data, (ii) the slow C&M data, (iii) the first layer in-band protocol data, and (iv) the vendor specification data.

4. The master unit of claim 1, wherein the plurality of compression algorithms are selected from LZ4 compression scheme, Snappy compression scheme, Brotli compression scheme, Zstandard compression scheme, and Gzip compression scheme.

5. A radio unit comprising:
one or more processors;
a memory configured to store one or more programs executed by the one or more processors; and
a communication interface,
wherein the communication interface is configured to receive control management data compressed by a master unit through a sub-channel of a common public radio interface (CPRI), and
the one or more processors are configured to restore the compressed control management data allocated to the sub-channel of the CPRI,
wherein the sub-channel to which the compressed control management data are allocated includes (i) a first flag having information about whether the sub-channel is compressed and (ii) a second flag having information about a compression algorithm, and
the one or more processors are configured to select the compression algorithm from a plurality of compression algorithms according to the first flag and the second flag, and apply the selected compression algorithm to restore the compressed control management data.

6. The radio unit of claim 5, wherein the plurality of compression algorithms are selected from LZ4 compression scheme, Snappy compression scheme, Brotli compression scheme, Zstandard compression scheme, and Gzip compression scheme.

7. The radio unit of claim 5, wherein the CPRI is defined as a plurality of basic frames constituting a hyper frame, in which each basic frame includes a control word and a payload,
the payload corresponds to an in-phase and quadrature data (IQ data) block of user data, and
K control words gather to form M sub-channels, wherein M is a natural number less than K.

8. The radio unit of claim 5, wherein the compressed control management data are compressed for each sub-channel in relation to a part or all of (i) fast C&M data, (ii) slow control and management (C&M) data, (iii) first layer (L1) in-band protocol data, and (iv) vendor specification data.

9. A radio access network system comprising:
a master unit and a radio unit communicating through a common public radio interface (CPRI),
wherein the master unit is configured to compress control management data to be assigned to a sub-channel of the CPRI, and transmit the compressed control management data to the radio unit through the sub-channel of the CPRI, and
the radio unit is configured to receive the control management data compressed by the master unit through the sub-channel of the CPRI and restore the compressed control management data allocated to the sub-channel of the CPRI,
wherein the master unit is configured to select one compression algorithm from a plurality of compression algorithms according to a reference data size and compress the control management data by applying the selected compression algorithm, and
the sub-channel to which the compressed control management data are allocated includes (i) a first flag having information about whether the sub-channel is compressed and (ii) a second flag having information about the selected compression algorithm.

10. The radio access network system of claim 9, wherein the CPRI is defined as a plurality of basic frames constituting a hyper frame, in which each basic frame includes a control word and a payload,
the payload corresponds to an in-phase and quadrature data (IQ data) block of user data, and
K control words gather to form M sub-channels, wherein M is a natural number less than K.

11. The radio access network system of claim 9, wherein the compressed control management data are compressed for each sub-channel in relation to a part or all of (i) fast C&M data, (ii) slow control and management (C&M) data, (iii) first layer (L1) in-band protocol data, and (iv) vendor specification data.

* * * * *